Patented Aug. 14, 1945

2,382,475

UNITED STATES PATENT OFFICE 2,382,475

METHOD FOR PRODUCING PLANT EXTRACTS

Ole Gisvold, Minneapolis, Minn., assignor to Regents of the University of Minnesota, Minneapolis, Minn., a corporation of Minnesota No Drawing. Application June 9, 1943, Serial No. 490,149

9 Claims. (Cl. 260—619)

This invention relates to the preparation of relatively pure extracts of plants of the species *Larrea divaricata*, suitable for use in pharmaceuticals and foods. Plants of the species *Larrea divaricata* are sometimes also known as *Larrea tridentata* or *Covellea tridentata*, and are commonly known in the United States as creosote bush. The term *Larrea divaricata* will be used herein.

It has been discovered that plants of the species *Larrea divaricata* contain nordihydroguaiaretic acid, a compound of phenolic nature, having the empirical formula $C_{18}H_{22}O_4$ and the structure:

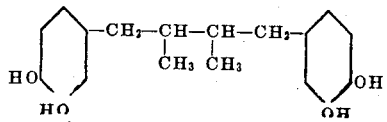

According to the Geneva nomenclature, nordihydroguaiaretic acid may be designated beta, gamma-dimethyl, alpha delta-bis (3,4-dihydroxyphenyl) butane. The melting point of this material is 183°–184° C.

In addition to nordihydroguaiaretic acid, plant material of the species *Larrea divaricata* also appears to contain other phenolic constituents, rubber-like substances, pigments, cellulose and various other complexes, which are undesirable contaminants insofar as concerns many uses of the nordihydroguaiaretic acid component, although some of such other constituents are in themselves useful.

It is an object of the invention to provide a convenient, efficient method of separating the constituents of natural plant material of the species *Larrea divaricata*, and a particular object to provide methods of making extracts having a high concentration of nordihydroguaiaretic acid.

Other objects of the invention include the provision of economical methods of extracting *Larrea divaricata* without, in the first instance, using solvents of organic character. It is a more specific object of the invention to provide an improved economical method of making extracts from *Larrea divaricata* utilizing aqueous extraction methods and to obtain pure and nearly pure nordihydroguaiaretic acid therefrom.

In carrying out the invention, there may be utilized the whole plant, including the entire woody portions, leaves, stems, flowers and buds. The plant material may be used either in the dried or green states, the latter being preferred. The plant material is preferably not ground, although chopped or packed plant material may be used for convenience and handling.

The plant material is extracted with an aqueous solution of alkali hydroxide such as sodium hydroxide, potassium hydroxide or with ammonium hydroxide. Sodium and potassium hydroxides are preferred because of their excellent extractive ability, low cost and availability. The aqueous hydroxide solution may be used either weak or strong, preferably a concentration of from 2 to 10%, and to the aqueous solution there is added a reducing agent, preferably sodium hydrosulfite, the percentage of the latter being about half of the percentage of the hydroxide, viz. 1–5%, although this is not critical. The reducing agent serves to protect the ortho hydroquinone nuclei of the nordihydroguaiaretic acid from oxidation during the alkali extraction. Sodium hydrosulfite serves admirably for this purpose but other reducing agents of equivalent strength, capable of reducing orthoquinones to the corresponding ortho hydroquinones under alkaline conditions, may be used. The extraction is made at room temperature, viz. 15–25° C., although slightly elevated temperatures are not harmful.

Extraction is carried out by leaching or percolation, and is usually complete in from 15 minutes to 1 hour. If desired, the extraction may be carried out by a counter-current procedure in a number of vessels; the aqueous hydroxide-reducing agent solution being removed from the first vessel and conveyed onto the plant material of the second vessel after a few minutes extraction in the first vessel. Thereafter, a fresh sodium hydroxide-reducing agent solution is conveyed to the first vessel and after a suitable interval the leaching solution of the second vessel is removed and conveyed into a third vessel containing fresh plant material while the aqueous hydroxide-reducing agent solution is likewise conveyed from the first vessel to the second vessel. This may be repeated through any number of vessels, the aqueous hydroxide-reducing agent solution being permitted to remain in each vessel for a short time, after which it is removed and conveyed to the next succeeding vessel in the series. After from 2 to 4 leachings of the plant material in the first vessel, the extraction of the plant material therein is complete and it is removed and discarded whereupon fresh plant material is placed in this vessel and it becomes the last in the series. By this counter-flow procedure, efficient use may be made of the aqueous hydroxide-reducing agent solution.

The leaching liquid containing the extracted material is then acidulated with any suitable inorganic or organic acid, hydrochloric, sulfuric and glacial acetic acids being exemplary. It is desired that the acidulation be carried to the point at which a flocculation appears in the extraction solution, at which point the solution is just neutral or a trifle basic when tested with litmus. In the event too much acid is added, a considerable precipitation will occur but there still remains an appreciable dispersion of colloidal particles. However, no harm is done by over acidulation, and should such be encountered, it is only necessary to add a dilute alkali solution to decrease the acidity slowly until the flocculation again appears. At the flocculation stage, there still remains in the extraction liquor a considerable amount of suspended matter which imparts to the liquor a somewhat cloudy appearance. However, the flocculent precipitate represents a good portion of the desired constituents and this settles out after standing for 12 hours or more. Due to consideration of cost of raw material, it is usually unnecessary to recover the suspended matter in the extraction liquor but this may be recovered and used if desired.

The aqueous extraction solution, neutralized as indicated, may also be treated by centrifuging in order to facilitate separation of the flocculent precipitate. Also, under some conditions, a fairly tough curd develops and agglomerates. Where settling is used, a longer period of settling as for example a week or more, causes the flocculent precipitate to settle in a fairly solid mass and this is desirable since it is useful to remove as large an amount of water as is possible at this stage.

The separated flocculent precipitate whether in the form of a sludge or fairly hard mass is then dissolved in a short chain water soluble aliphatic alcohol having not more than 3 carbon atoms, preferably methyl, ethyl, normal propyl or isopropyl alcohol, the amount of alcohol used being from 1 to 2 times the volume of sludge. Methyl alcohol is desired because of its favorable action, low cost and availability.

The alcohol solution is then acidulated with concentrated hydrochloric until the mass becomes distinctly acid to litmus, so as to neutralize any hydroxide carried over by the sludge and the mass is then diluted with an ether such as diethyl ether or isopropyl ether, the amount of ether being 5 to 10 times the amount of alcohol used. The alcohol-ether layer is then separated from any insoluble residue and undissolved water.

The initial dilution of the sludge with alcohol is a convenience, but strictly speaking, is not essential to the process. The original extraction of the plant material with alkali-reducing agent solution dissolves, not only the ether-soluble materials, but also certain ether-insoluble components, which are however soluble in alcohol. The entire alkali extraction is precipitated in the sludge and the various components are intimately mixed together. It is possible with some patience to dissolve the desired ether-soluble components from the sludge directly with ether, but the preliminary dissolution with alcohol so facilitates the later formation of the ether solution, that the alcohol technique is recommended.

When alcohol has been used, water is then added to the separated alcohol-ether layer in the proportion of 3 to 6 volumes of water for each volume of alcohol originally used and the mass is shaken and allowed to separate into layers. The water-alcohol layer is then separated and is discarded or worked up for other purposes, and the ether layer is separated. The addition of water at this point is for the purpose of separating the alcohol. Where the ether solution is made without preliminarily dissolving the sludge in alcohol, there is no alcohol to separate and hence no necessity for the water additions.

The ether layer is slightly colored and contains the desired fractions, including large percentages of nordihydroguaiaretic acid. The ether solution may then be fractionated by extracting it with successive portions of aqueous alkali solution containing a reducing agent, as set forth in my co-pending application Serial No. 478,321, filed March 6, 1943. The aqueous extracting solution for fractionating is used in successive portions and is preferably an aqueous sodium or potassium hydroxide (3 to 8%) containing a considerable amount of strong reducing agents such as sodium hydrosulfite (1½ to 4%).

The total volume of aqueous solution of alkali hydroxide and reducing agent used for the fractionating extraction may be varied widely, and may be used in a few portions of relatively large size or a number of smaller portions as hereinafter explained. The reaction by which extractions of the plant fractions are selectively accomplished, appears to be due to the selective salt formation of the fractions with the hydroxide used, one fraction being nearly completely reacted before the next fraction is reacted appreciably. By using appropriately size portions of aqueous hydroxide solutions and then removing the aqueous layer (which, after extracting, contains the salt of the reaction product) it is possible to fractionate the plant material.

In order to determine the amount of hydroxide necessary for reaction for each plant fraction, it is best initially to carry out the reaction in 20 to 30 small batches, each aqueous hydroxide portion being added, reacted and removed. Then by later judging the resulting plant extract produced by each successive portion, it is possible to determine the total amounts of hydroxide necessary to reaction with each particular fraction.

Thus, where working with two liters of the ether solution containing 20% to 30% of primary plant extract, the aqueous hydroxide-reducing agent solution may conveniently be used in portions of 15 to 50 cc. After the first portion of aqueous hydroxide-reducing agent solution has been added to the ether solution of semi-purified plant extract, the mixture is thoroughly shaken for several minutes, then allowed to settle, and the aqueous layer separated. The aqueous layer contains one type of plant extract factor and to release it, the aqueous solution is acidulated with hydrochloric or sulfuric acid until the solution is acid to litmus. The aqueous solution is set aside or placed upon a steam bath and the dissolved plant extract factor later settles out.

This procedure of separation extraction is repeated 20 to 35 times and each aqueous portion which contains some plant factor, is set aside. The portions are preferably numbered sequentially for record purposes. All extractions are allowed to stand at room temperature (16–18° C.), or may be heated on a steam bath to drive off the dissolved ether, and after a number of hours in each aqueous extraction solution, there appears a solid residue which settles out. The residue of the first 8 to 12 extractions is a yellow-brown, water-insoluble, viscous material. At one or two successive intermediate extractive portions in the series, the settled residue appears as a distinctly crumbly yellow-brown cake. Thence, through the successive extractions beyond those having the characteristic of a crumbly cake, the residue is distinctly crystalline material which may agglomerate into masses that are easily dried and broken. When dry (and before the lumps are broken) the masses are yellow with a tinge of brown, not quite as yellow nor as hard as lump sulfur. The agglomerates are easily powdered with moderate pressure, and upon powdering the yellow color is much less accentuated; the brownish tinge almost disappears.

If a sufficient number of extractions are made (sometimes 30 to 35), the yield of distinctly crystalline material is maintained fairly constant until at one of the extractions, the yield rather sharply decreases, indicating that all of the plant material that is soluble in the alkali hydroxide has been separated out. The last or last several extractions may contain a greenish pigment and for the sake of purity, these are separately collected.

In order to enable the operator to discern the change point or "break" in the series of aqueous extractions, separating those yielding viscous material and those yielding the distinctly crystalline nordihydroguaiaretic acid, the operator may, while making the extractions, test each one for the color reactions of catechol as set forth on pages 2 and 3 of my co-pending application Serial No. 478,321 filed March 6, 1943. The first extractions which ultimately yield the viscous material will not show the characteristic catechol color reactions. The one or two extractions which yield the crumbly cake begin to show the characteristic color reactions and the latter extractions which ultimately yield 90–100% pure nordihydroguaiaretic acid as a distinctly crystalline material show the color reactions very markedly. The break in the series is quite marked, and the operator can thus tell, after acidulation and standing, the type of material that one may expect to be obtained from each extraction. The color reactions thus afford a convenient and sensitive control.

The series of final fractionation extractions with hydroxide-reducing agent solution serves as a means of separating useful components of the plant material. The water-insoluble, yellow-brown viscous material of the first extractions may, if desired, be gathered together as one plant extract fraction. As this material is phenolic in nature and exhibits some germicidal and antioxidant properties, it is useful for many purposes. Thus, a commercial grade of lard, having a normal life of 5 hours when tested according to the Swift rapid rancidity test, will resist development of oxidative rancidity for about 20 hours when 0.01% of this fraction is added thereto. It may be pointed out that a "5 hour" commercial lard, i. e. one capable of resisting development of oxidative rancidity for 5 hours when tested according to the Swift rapid rancidity method, is not at all unusual, although other grades of lard produced under ideal conditions may, in their natural state, have a life of 20–30 hours. Thus, by using 0.01% of this fraction, an average commercial grade of lard may be given a shelf life equal to the very best commercial grades.

The crumbly-caked material of the intermediate extractions is the line of demarcation in the series and such material may be collected separately or reworked in subsequent batches. The properties of this material partake of the characteristics of both the viscous material of the earlier extractions and the distinctly crystalline material of the subsequent extractions. The distinctly crystalline material of the latter extractions is 90–100% pure nordihydroguaiaretic acid, (beta, gamma-dimethyl, alpha, delta-bis (3,4 dihydroxyphenyl) butane).

When the distinctly crystalline material is added to lard in a concentration of 1/100%, a 20 hour lard resists development of oxidative rancidity for 136–140 hours when tested in accordance with the Swift rapid rancidity test described in "Oils and Soap," vol. 10 pages 105–109 (1933). A control sample tested under like conditions develops oxidative rancidity in 20 hours. The distinctly crystalline material is also an effective germicide for it inhibits growth of *Staphylococcus aureus* in concentration of 5 parts/million and kills *Staphylococcus aureus* in concentrations of 25 parts/million.

The invention is further illustrated by the following specific examples which should not, however, be interpreted as limitations upon the invention.

*Example I*

Six kilograms of dried plant material of the species *Larrea divaricata*, including stems and leaves, was extracted by percolating with 24 liters of 5% sodium hydroxide containing 2% sodium hydrosulfite. The percolation was continued for one-half hour whereupon the aqueous percolating solution was drained off and acidulated with 50% hydrochloric acid. The acid was added carefully as the neutral point (using litmus as an indicator) was approached, whereupon a flocculent precipitate appeared. The flocculent precipitate was allowed to settle for about a day and the resultant yellow-brown colored sludge containing the precipitate was removed by decanting the supernatant liquor.

To the sludge so obtained, there was then added twice its volume of methyl alcohol, which served to dissolve the flocculent precipitate, and formed a homogenous solution with the water present in the sludge. The alcoholic solution of sludge was then acidulated with concentrated hydrochloric acid, concentrated acid being used so as not to introduce any more water than necessary at this point. If desired, dry hydrogen chloride gas may likewise be used. The acidulated alcoholic solution of sludge was then diluted with 8 liters of diethyl ether and the mass shaken and allowed to settle, whereupon two layers formed. One layer containing the ether, most of the alcohol and the ether-soluble constituents was separated from the other layer which contained some alcohol, water from the sludge, and ether-insoluble materials of the plant. The recovered ether layer was then washed with five volumes of water for each volume of methyl alcohol used in order to separate the remainder of the alcohol from the ether layer. This washing may be repeated, if desired. The thus washed ether layer contained the desired nordihydroguaiaretic acid fractions.

The ether solution was then extracted with 22 portions of an aqueous 5% solution of potassium hydroxide containing 2½% of sodium hydrosulfite, each portion of aqueous extracting solution being about 120 cc. In each instance, the aqueous potassium hydroxide-sodium hydrosulfite solution was added to the ethereal solution and shaking continued for 2 to 3 minutes whereupon the mixture was allowed to settle and the aqueous layer removed, acidulated and set to warm on a steam bath. Each of the aqueous extractions so made and acidulated was numbered successively.

After a short period (10–20 minutes) of heating on the steam bath, the dissolved ether was evaporated. Portions 1 to 4 were yellow and contained a somewhat oily layer; portions 5 and 6 contained a layer of definitely solid material; portions 7 through 18 contained solid pale yellow colored crystalline material; portions 19 through 22 were oily and slightly yellow. Portions 7 through 18 yielded 150 grams of crystalline nordihydroguaiaretic acid or approximately 2.5% of nordihydroguaiaretic acid based upon the amount of whole plant used as starting material. The crystalline nordihydroguaiaretic acid of portions 7 through 18 averaged about 95% purity and some of the portions were almost 100% pure.

Where it is desired to remove even the faintest trace of color remaining in the crystalline nordihydroguaiaretic acid, this may be accomplished by pulverizing the crystalline nordihydroguaiaretic acid obtained from portions 7 through 18, and suspending the ground material in glacial acetic acid. The glacial acetic acid is then filtered off and the decolorized crystalline nordihydroguaiaretic acid washed with pure water and dried. The loss occasioned by such decolorizing procedure is about 10% of the slightly colored nordihydroguaiaretic acid used.

Example II

Three kilograms of green, slightly but not entirely dried, whole plant material containing the trunk of the plant, stems, leaves and buds, but not including the root, was extracted with 18 liters of 5% sodium hydroxide containing 1½% sodium hydrosulfite. The extraction was carried out by placing the whole plant material in a percolator whereupon the aqueous hydroxide-hydrosulfite solution was poured through in several passes, the percolation being complete after about one-half hour. The aqueous extraction solution was then acidulated with hydrochloric acid, as in Example I, until a flocculent precipitate appeared. The extraction solution was then centrifuged and in this manner the flocculent precipitate was separated as a sticky sludge only partially fluid.

The sticky partially fluid sludge was then mixed with twice its volume of methyl alcohol whereupon the sludge dissolved and the alcohol solution was then acidulated with glacial acetic acid until acid to litmus. The use of glacial acetic acid avoids the addition of water to the extracted material, and is desirable for this purpose. Four liters of diethyl ether were then added to the acidulated alcoholic solution of sludge and the ether layer (which contained some alcohol) was decanted into a separatory funnel for further processing. The alcoholic layer containing the water of the sludge and some ether-insoluble material was discarded.

Water in the amount of about 8 times the volume of sludge (or 4 times the volume of methyl alcohol used) was then added to the ether-alcohol mixture in a separatory funnel, and the mixture was shaken and allowed to separate into layers. The resultant water-alcohol layer was separated and discarded. This washing process may be repeated, if desired.

The ether solution was subjected to successive fraction extractions using a 5% aqueous solution of potassium hydroxide containing 2½% sodium hydrosulfite. The ethereal solution was extracted successively 22 times using 50 cc. portions of the hydroxide-sodium hydrosulfite solution, and each extractive portion, after being shaken with the ethereal solution, was allowed to settle and was separated out whereupon it was acidulated with hydrochloric acid and placed on a steam bath so as to drive off dissolved ether. The extractive portions were numbered successively and after cooling and standing, portions 1 to 4 yielded a yellow and oily material; portions 5 and 6 were solid and somewhat crystalline; portions 7 through 18 were solid and contained pale yellow colored crystalline nordihydroguaiaretic acid; portions 19 through 22 were somewhat oily and slightly yellow color having a tinge of red. Portions 7 through 18 yielded 80 grams of crystalline nordihydroguaiaretic acid or 2.66% of nordihydroguaiaretic acid based upon the weight of whole plant used as starting material. The crystalline nordihydroguaiaretic acid so recovered averaged about 95% purity, some of the portions being almost 100% pure.

When dry and powdered, the nordihydroguaiaretic acid so obtained had a faint, almost imperceptible yellow color and was useful directly as an antioxidant in lard.

Many obvious variations will occur to those skilled in the art and are considered to be within the purview of the invention illustrated, described and claimed.

I claim as my invention:

1. The process which comprises extracting plant material of the species *Larrea divaricata* with an aqueous solution of alkali hydroxide containing a reducing agent, acidulating the aqueous extraction solution until a flocculent precipitate occurs, and separating the flocculent, nordihydroguaiaretic acid containing precipitate therefrom.

2. The process which comprises extracting plant material of the species *Larrea divaricata* with an aqueous solution of alkali hydroxide containing a reducing agent, acidulating the aqueous extraction solution until a flocculent precipitate occurs, separating and dissolving the flocculent precipitate in a water-immiscible solvent whereby selected fractions of the precipitate are dissolved in the water-immiscible solvent, and recovering the said selected fractions from said solvent.

3. The process which comprises extracting plant material of the species *Larrea divaricata* with an aqueous solution of alkali hydroxide containing a reducing agent, acidulating the aqueous extraction solution until a flocculent precipitate occurs, separating and dissolving said flocculent precipitate in a short chain water-soluble aliphatic alcohol having not more than 3 carbon atoms whereby the flocculent precipitate is dissolved, admixing said alcohol solution with a water-immiscible organic solvent capable of dissolving nordihydroguaiaretic acid, and recovering the selectively dissolved plant extracts from said water-immiscible solvent.

4. The process which comprises extracting plant material of the species *Larrea divaricata* with an aqueous solution of alkali hydroxide containing a reducing agent, acidulating the aqueous extraction solution until a flocculent precipitate occurs, separating and dissolving said flocculent precipitate in a short chain water-soluble aliphatic alcohol having not more than 3 carbon atoms whereby the flocculent precipitate is dissolved, admixing said alcohol solution with a water-immiscible organic solvent capable of dissolving nordihydroguaiaretic acid, thereafter extracting said mixture with water and removing the water-alcohol solution from the water-immiscible organic solvent and recovering the dissolved plant fractions from the water-immiscible organic solvent.

5. The process which comprises extracting plant material of the species *Larrea divaricata* with an aqueous solution of alkali hydroxide containing a reducing agent, acidulating the aqueous extraction solution until a flocculent precipitate occurs, separating and dissolving said flocculent precipitate in a short chain water-soluble aliphatic alcohol having not more than 3 carbon atoms, whereby the flocculent precipitate is dissolved, admixing said alcohol solution with a water-immiscible organic solvent capable of dissolving nordihydroguaiaretic acid, thereafter extracting said mixture with water and removing the water-alcohol solution from the water-immiscible organic solvent, and successively extracting said water-immiscible organic solvent solution of plant fractions with successive portions of aqueous solutions of alkali containing reducing agent.

6. The process which comprises extracting plant material of the species *Larrea divaricata* with an aqueous solution of sodium hydroxide containing sodium hydrosulfite, separating and acidulating said solution until a flocculent precipitate occurs, separating and dissolving said flocculent precipitate in a short chain water-soluble alcohol selected from the class consisting of methyl alcohol, ethyl alcohol, normal propyl alcohol, and isopropyl alcohol, thereby to dissolve the flocculent precipitate, acidulating said alcohol solution and mixing ether and water therewith, separating the water-alcohol fractions of said mixture and recovering the extracted plant fractions dissolved in said ether.

7. The process which comprises extracting plant material of the species *Larrea divaricata* with an aqueous solution of sodium hydroxide containing sodium hydrosulfite, separating and acidulating said solution until a flocculent precipitate occurs, separating and dissolving said flocculent precipitate in a short chain water-soluble alcohol selected from the class consisting of methyl alcohol, ethyl alcohol, normal propyl alcohol and isopropyl alcohol, thereby to dissolve the flocculent precipitate, acidulating said alcohol solution and mixing ether and water therewith, separating the water-alcohol fractions of said mixture and thereafter repeatedly extracting said ether solution with an aqueous solution of sodium hydroxide containing sodium hydrosulfite, acidulating said successive aqueous extractions and separately recovering the thus formed precipitates therefrom.

8. The process which comprises extracting plant material of the species *Larrea divaricata* with an aqueous solution of alkali hydroxide containing a small percentage of sodium hydrosulfite, separating and acidulating the aqueous extraction solution until a flocculent precipitate occurs, separating said flocculent precipitate and recovering the nordihydroguaiaretic acid therefrom.

9. The process which comprises extracting plant material of the species *Larrea divaricata* with an aqueous solution containing from 2 to 10% sodium hydroxide and from 1 to 5% sodium hydrosulfite, adjusting the acidity of the aqueous extraction solution until a flocculent precipitate occurs, and separating the flocculent nordihydroguaiaretic acid containing precipitate therefrom.

OLE GISVOLD.